(12) United States Patent
Koch-Groeber et al.

(10) Patent No.: US 8,275,497 B2
(45) Date of Patent: Sep. 25, 2012

(54) METHOD AND DEVICE FOR ASSISTING IN DRIVING A VEHICLE

(75) Inventors: Hermann Koch-Groeber, Stuttgart (DE); Werner Uhler, Bruchsal (DE); Marc Arnon, Ingolstadt (DE); Danny Jaeger, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 780 days.

(21) Appl. No.: 12/278,172

(22) PCT Filed: Feb. 12, 2007

(86) PCT No.: PCT/EP2007/051358
§ 371 (c)(1),
(2), (4) Date: Dec. 17, 2008

(87) PCT Pub. No.: WO2007/104625
PCT Pub. Date: Sep. 20, 2007

(65) Prior Publication Data
US 2009/0187343 A1    Jul. 23, 2009

(30) Foreign Application Priority Data
Mar. 13, 2006   (DE) .......................... 10 2006 011 481

(51) Int. Cl.
*G05D 1/00* (2006.01)
(52) U.S. Cl. .................. 701/10; 701/1; 701/36; 701/96; 701/200; 701/207; 701/209; 701/301; 700/97; 340/435; 340/438; 340/903; 188/72.1; 342/118; 361/719; 369/6; 382/104
(58) Field of Classification Search ................ 701/1, 36, 701/96, 200, 207, 209, 301; 700/97; 340/435, 340/438, 903; 188/72.1; 342/118; 361/719; 369/6; 382/104
See application file for complete search history.

(56) References Cited

U.S. PATENT DOCUMENTS

| | | | | |
|---|---|---|---|---|
| 4,731,769 | A | * | 3/1988 | Schaefer et al. .................. 369/6 |
| 2002/0093793 | A1 | * | 7/2002 | Simon ........................... 361/719 |
| 2002/0110261 | A1 | * | 8/2002 | Yanai ............................. 382/104 |
| 2002/0133285 | A1 | * | 9/2002 | Hirasago ......................... 701/96 |

(Continued)

FOREIGN PATENT DOCUMENTS
CN          1057814        1/1992
(Continued)

OTHER PUBLICATIONS
International Search Report, PCT International Patent Application No. PCT/EP2007/051358, dated May 11, 2007.

*Primary Examiner* — James Trammell
*Assistant Examiner* — Sanjeev Malhotra
(74) *Attorney, Agent, or Firm* — Kenyon & Kenyon LLP

(57) ABSTRACT

A method and device for assisting in driving a vehicle, particularly a motor vehicle, having a surroundings detector for detecting at least a partial area of the surroundings of the vehicle, an output device for the output of information concerning the vehicle surroundings obtained from the surroundings detection to a driver, and an evaluation unit for determining a risk level based on the vehicle-surroundings information. To facilitate driving of the vehicle, it is provided that at least a portion of the vehicle-surroundings information provided for determining the risk level, and the risk level determined by the evaluation unit are output continuously by the output device to the driver during operation of the vehicle.

10 Claims, 5 Drawing Sheets

U.S. PATENT DOCUMENTS

| | | | |
|---|---|---|---|
| 2003/0060912 A1* | 3/2003 | Ogasawara et al. | 700/97 |
| 2004/0107030 A1* | 6/2004 | Nishira et al. | 701/36 |
| 2005/0134479 A1 | 6/2005 | Isaji et al. | |
| 2005/0143911 A1* | 6/2005 | Ishibashi et al. | 701/209 |
| 2005/0231340 A1* | 10/2005 | Tauchi | 340/435 |
| 2005/0256630 A1* | 11/2005 | Nishira et al. | 701/96 |
| 2005/0273263 A1* | 12/2005 | Egami et al. | 701/301 |
| 2006/0041381 A1* | 2/2006 | Simon et al. | 701/301 |
| 2006/0178789 A1* | 8/2006 | Kuge | 701/1 |
| 2006/0178830 A1* | 8/2006 | Sherony | 701/301 |
| 2006/0181431 A1* | 8/2006 | Konishi et al. | 340/903 |
| 2006/0197701 A1* | 9/2006 | Heide et al. | 342/118 |
| 2007/0021904 A1* | 1/2007 | Kawamata et al. | 701/200 |
| 2007/0043502 A1* | 2/2007 | Mudalige et al. | 701/207 |
| 2007/0084678 A1* | 4/2007 | Lucas et al. | 188/72.1 |
| 2007/0165910 A1* | 7/2007 | Nagaoka et al. | 382/104 |
| 2007/0182529 A1* | 8/2007 | Dobler et al. | 340/438 |

FOREIGN PATENT DOCUMENTS

| | | |
|---|---|---|
| DE | 19839198 | 3/2000 |
| DE | 10247563 | 4/2004 |
| DE | 10 2004 059 129 | 7/2005 |
| DE | 102004009924 | 9/2005 |
| EP | 1407931 | 4/2004 |
| EP | 1531082 | 5/2005 |
| EP | 1557784 | 7/2005 |
| FR | 2864311 | 6/2005 |

* cited by examiner

METHOD AND DEVICE FOR ASSISTING IN DRIVING A VEHICLE

BACKGROUND INFORMATION

The present invention relates to a method for assisting in driving a vehicle, particularly a motor vehicle. The motor vehicle has a surroundings detector for detecting at least a partial area of the surroundings of the vehicle, an output device for the output of information concerning the vehicle surroundings obtained from the surroundings detection to a vehicle driver, and an evaluation unit for determining a risk level based on the vehicle-surroundings information. The present invention also relates to a device for a vehicle, particularly a motor vehicle, for implementing an aforesaid method, having a surroundings detector for detecting at least a partial area of the surroundings of the vehicle, an output device for the output of information concerning the vehicle surroundings obtained from the surroundings detection to a driver, and an evaluation unit for determining a risk level based on the vehicle-surroundings information.

A method indicated at the outset and a device indicated at the outset are described in German Patent No. DE 102 47 563 A1. In particular, this patent describes a method and system for assisting a driver of a vehicle, having a camera for recording at least a portion of the surroundings of the vehicle, and a display device for displaying the surroundings recorded by the camera. In that case, with the aid of a data-processing system, risk objects picked up by the camera which represent a possible danger to the vehicle are to be displayed more conspicuously on the display device than objects which pose no danger.

Moreover, German Patent No. DE 198 39 198 A1 describes a method for the display of driver information in a motor vehicle, in which an optical information signal is intended to be faded into a windshield and/or a rearview mirror of the motor vehicle when a predetermined vehicle condition and/or traffic condition has been detected by a detector for recording vehicle conditions and/or traffic conditions. The optical information signal contains a directional instruction concerning the direction in which a driver should direct his attention.

SUMMARY

An object of the present invention is to provide a method which further facilitates the driver in driving the vehicle. A further object of the present invention is to supply a device for carrying out such a method.

The first-named objective may be achieved according to an example embodiment of the present invention by a method of the type indicated at the outset, in which at least a portion of the vehicle-surroundings information provided for determining the risk level, and the risk level determined by the evaluation unit are continually output by the output device to the driver during operation of the vehicle.

The second objective may be achieved according to an example embodiment of the present invention by a device of the type indicated at the outset, in which the output device is controllable in such a way that at least a portion of the vehicle-surroundings information provided for determining the risk level, and the risk level are able to be output continually by the output device to the driver.

An advantage of the example embodiments of the present invention is that the driver continuously, thus perpetually receives information about at least a significant section of the surroundings of the vehicle, e.g., a roadway lying in front of the vehicle that is to be traveled by the vehicle, including edge areas of the roadway, particularly road shoulders. For example, this information may point out foreign objects or also contain details concerning the condition of the road. The information concerning the vehicle surroundings is not individualized with regard to a specific object, e.g., a specific motor vehicle standing on the roadway, but rather the information includes, for example, the presence of any object in the vehicle surroundings possibly signifying a danger of collision in general. Accordingly, the risk level also does not indicate, for example, a probability of an imminent collision with a specific object, e.g., the above-cited motor vehicle standing on the road; rather, the risk level—based on the example case of a possible danger of collision—is a measure for the risk that a collision will take place at all with any object in the vehicle surroundings. For example, the risk level may in general indicate a risk for the vehicle, and be determined by the evaluation unit in such a way that the risk level is yielded as the product of a possible extent of damage and a probability of an occurrence of the damage on which the extent of damage is based. Preferably, the output device for the continuous output of vehicle-surroundings information and risk level is controlled by the evaluation unit or by a separate control unit. Due to the continuous, and indeed, in particular, the constantly changeable, stepless, i.e., analog output of the vehicle-surroundings information and the risk level corresponding to it, the driver is constantly kept informed about the surroundings of the vehicle; he does not, as is the case in the conventional method, have to react suddenly because a warning signal is output surprisingly and unexpectedly in the event a specific risk level is exceeded. With the method and the device of the present invention, advantageously the driver is constantly able to observe an increasing and/or decreasing risk, and therefore react early on in a well-considered and unsurprised manner. The present invention may very advantageously assist the driver considerably in driving the vehicle in a manner extremely well adapted to the situation. Traffic safety may thereby be increased considerably using the present invention, particularly during nighttime driving when using distance-measuring sensors, for example, such as ultrasonic or radar sensors in the detector for detecting objects in the surroundings of the vehicle. The present invention is suitable for vehicles of any type; however, because of the high road-traffic density, it is particularly advantageous if the vehicle is a motor vehicle, preferably an automobile or a commercial vehicle. The driver is then the driver of the motor vehicle. Using the present invention which has no sharply defined warning levels, advantageously, it is possible in particular to improve a human-machine interface of driver assistance systems for collision warning. It is a great advantage that the possibility of false warnings to the driver is reduced considerably by the present invention, thus preventing a loss of confidence by the driver in the device provided for his assistance; nevertheless, using the invention, advantageously early information and especially warning is furnished to the driver. A risk for the vehicle which is objective to the greatest extent possible is continuously transmittable to the driver using the present invention; by the continuous communication, the driver is able to undergo a learning process, so that after a while, the driver may be able to bring the communicated objective risk in line with his subjective perception. In this way, the invention supports a driving of the vehicle which is individual to the driver. After a settling-in phase, using the present invention, the driver may be able to intuitively create an impression for himself about the riskiness or an instantaneous driving situation, even when he himself cannot yet recognize objects potentially threatening a collision—for example, at night.

According to one advantageous further refinement of the present invention, the evaluation unit may determine a reliability of the assertion with respect to the risk level, and the reliability of the assertion is continually output by the output device to the driver during operation of the vehicle. It is thereby possible to advantageously take into account that, for example, sensors of the detector exhibit a detection inaccuracy and/or that, for instance, the risk level is determined based only on approximation models; this results in a possible error in stating the level of risk, this possible error being communicated as a reliability of the assertion to the driver, who may thus include it in his assessment of a driving situation.

Outputs to the driver may be given acoustically, e.g., using a loudspeaker, and/or haptically, for instance, with the aid of a vibration device linked to a vehicle seat or a vehicle steering wheel. On the other hand, for an output which is reliable but not possibly taxing for the driver, it is particularly advantageous if the vehicle-surroundings information and/or the risk level and/or the reliability of the assertion are output visually by the output device.

To facilitate very easy ascertainability and evaluation of the risk level for the driver, it may be advantageous if the risk level is output using a color-variable color display, and if a color of the color display is a measure for the risk level. For example, for a low risk level, the color green may be selected; as the risk level rises, the display may progressively change into the color red, for instance.

Advantageously, the driver is able to recognize a level of the reliability of the assertion very well if, according to a further advantageous refinement of the present invention, the reliability of the assertion is output using a bar display that is variable in length, and if a length of the bar display is a measure for the reliability of the assertion, It may be particularly advantageous that the attentiveness of the driver may be sensitized if the risk level is output using a blinking display, and if a blinking frequency and/or a build-up speed of the display is a measure for the risk level.

According to another advantageous refinement of the present invention, the reliability of the assertion is output using a display that is variable in light intensity, a light intensity of the display being a measure for the reliability of the assertion. Consequently, the driver is able to be informed continuously about the reliability of the assertion, without the danger of a sudden distraction from the traffic situation.

The driver may easily be provided with additional information, and specifically about a location of a potential danger for the vehicle, if at least a portion of the vehicle-surroundings information is output by the output device on a display device at a position in the display device corresponding to the location of a possible danger in the surroundings of the vehicle.

Moreover, in addition to risks in the vehicle surroundings, for the statement of a risk level it is also advantageous to take risks into account which emanate from the vehicle condition and/or the driving conditions of the vehicle. Thus, in the event of impairment of the vehicle like, for example, a decreasing tire pressure or a defective light, as well as in the case of high velocity without taking the vehicle surroundings into consideration, a considerable risk can already emanate from the operation of the vehicle itself, even if no risk for the vehicle can be recognized solely from the surroundings. Therefore, the risk potential resulting due to the vehicle condition or the driving conditions is advantageously taken into consideration for the statement of a risk, as well. To that end, the evaluation unit for determining a risk is advantageously connected to vehicle sensors which transmit information about the vehicle condition or the driving conditions of the vehicle to the evaluation unit.

Advantageously, the example device according to the present invention may be constructed particularly simply and cost-effectively if, according to a further refinement of the present invention, the output device has a display screen.

The example device of the present invention is able to have a very easily readable and operationally reliable display if the output device advantageously has a lighting chain. Lighting elements of the lighting chain are preferably light-emitting diodes (LEDs), which may also be multicolor LEDs. The lighting chain is therefore preferably an LED chain exhibiting great durability and featuring a low requirement of electrical energy for its operation.

Advantageously, the example device of the present invention is able to assist the driver even further in driving the vehicle if a reliability of the assertion of the risk level is determinable by the evaluation unit and if the output device is controllable in such a way that the reliability of the assertion is able to be output continuously to the driver by the output device.

BRIEF DESCRIPTION OF THE DRAWINGS

Exemplary embodiments of the present invention are shown schematically in the figures and are described in greater detail below.

DETAILED DESCRIPTION OF EXAMPLE EMBODIMENTS

Figure 1:
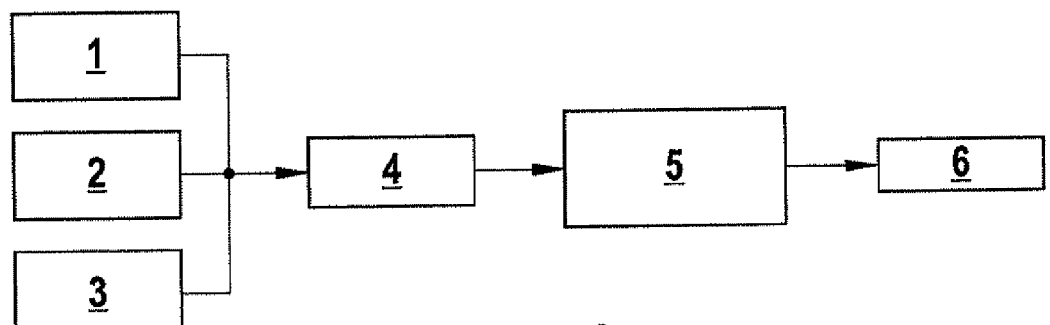
FIG. 1 shows a flowchart of an example method for assisting in driving a vehicle.

FIG. 1 shows, by way of example, a flowchart for a method for assisting in driving a vehicle, and specifically, in this example, a motor vehicle. In a first step, three sensors—symbolized by one block 1, 2, 3, each—of a surroundings detector for detecting at least a partial area of a surroundings of the vehicle detect a position of an object signifying a possible danger of collision for the vehicle in the surroundings of the vehicle. In the same way, information for the evaluation may also be acquired from vehicle sensors which monitor the vehicle condition and/or the driving conditions of the vehicle. In a next step symbolized by a following block 4, sensor data provided by the three sensors is merged in an evaluation unit, and based on the sensor data, information concerning the vehicle surroundings is generated for a driver. Moreover, in a third step symbolized by a further block 5, the evaluation unit determines a risk level, that is, a level of a potential danger to the vehicle. To that end, the evaluation unit ascertains the riskiness of a road space in a surroundings of the vehicle.

Subsequently, in a fourth step likewise symbolized by a block 6, at least a portion of the vehicle-surroundings information provided for determining the risk level, e.g., a distance to a vehicle in front of the motor vehicle, and the risk level determined by the evaluation unit are output continuously to the driver by an output device during operation of the vehicle; this continuous output advantageously signifies, on one hand, a constantly present, and on the other hand, a stepless output of the risk level, in particular. In general, the output device is a human-machine interface (HMI), to be more precise, in this case between motor vehicle and driver. The output to the driver takes place during an operation of the vehicle, i.e., for example, when a drive motor of the motor vehicle is started, or when the motor vehicle is in motion, thus, is traveling.

For example, the risk level may be output with the aid of a color-variable color display, a color of the color display being a measure for the risk level—e.g., green/yellow for a low risk and red for a high risk—or, for example, with the aid of a gray-tone display having a variable gray-scale value, a gray-scale value of the gray-tone display being a measure for the risk level—e.g., dark for a low risk and light for a high risk.

For example, based on the above-indicated object detected by the detector, the risk level may be a function of different variables. For instance, one of these variables may be a braking $a_{nec}$ of the motor vehicle which is necessary to avoid a collision and which a driver of the motor vehicle in danger of a collision must apply in order to reduce a relative velocity $v_{rel}$ with respect to the detected object to zero within a distance d to the object available for the braking. For example, braking $a_{nec}$ may be calculated as follows:

$$a_{nec} = \frac{v_{rel}^2}{2 \cdot d}.$$

A corresponding output gray-scale value GSV, which is a measure for the risk level, may then, as example, be obtained as function f from calculated braking $a_{nec}$ as well as possibly further object attributes $b_i$, so that the following applies:

$$GSV=f(a_{nec}, b_i).$$

For example, the possible further object attributes $b_i$ may include a weighting from a classification of the detected object. In the case of a color-variable display, a color could also take the place of gray-scale value GSV.

For instance, function f and thus gray-scale value GSV or the color may be proportional to braking $a_{nec}$ or to a weighting factor b of further object attributes $b_i$, so that, for example, the gray-scale value increases when braking $a_{nec}$ increases, thus a lower negative braking is necessary to avoid a collision.

For instance, a reliability of the assertion with respect to the risk level may be output to the driver with the aid of a transparency T of the display of the risk level, transparency T, for example, being a function of a detection reliability $D_{plaus}$ and optionally, e.g., a weighting factor c for the detected object. In general, for example, the relationship $$T=g(D_{plaus}, c)$$

applies for transparency T as function g. In this context, for example, detection reliability $D_{plaus}$ may assume a value between 0 and 1 that corresponds to the frequency the object was detected, and therefore supplies information as to how often the object has actually been detected by the detector in past measuring cycles; for example, theoretical lower limit $D_{plaus}=0$ may indicate that the object has not been detected at all in a specific number of measuring cycles, and upper limit $D_{plaus}=1$ may indicate, for example, that the object has been detected in every measuring cycle in the number of measuring cycles. For instance, weighting factor c may include a weighting of a traffic-lane assignment, that is, if the detected object was assigned by the evaluation unit to a specific traffic lane of a roadway, the traffic-lane assignment is provided with a corresponding weighting. For example, function g and therefore transparency T may be inversely proportional to detection reliability $D_{plaus}$, so that, for instance, transparency T decreases in the sense of an increased reliability of the assertion when detection reliability $D_{plaus}$ rises.

Figure 2:
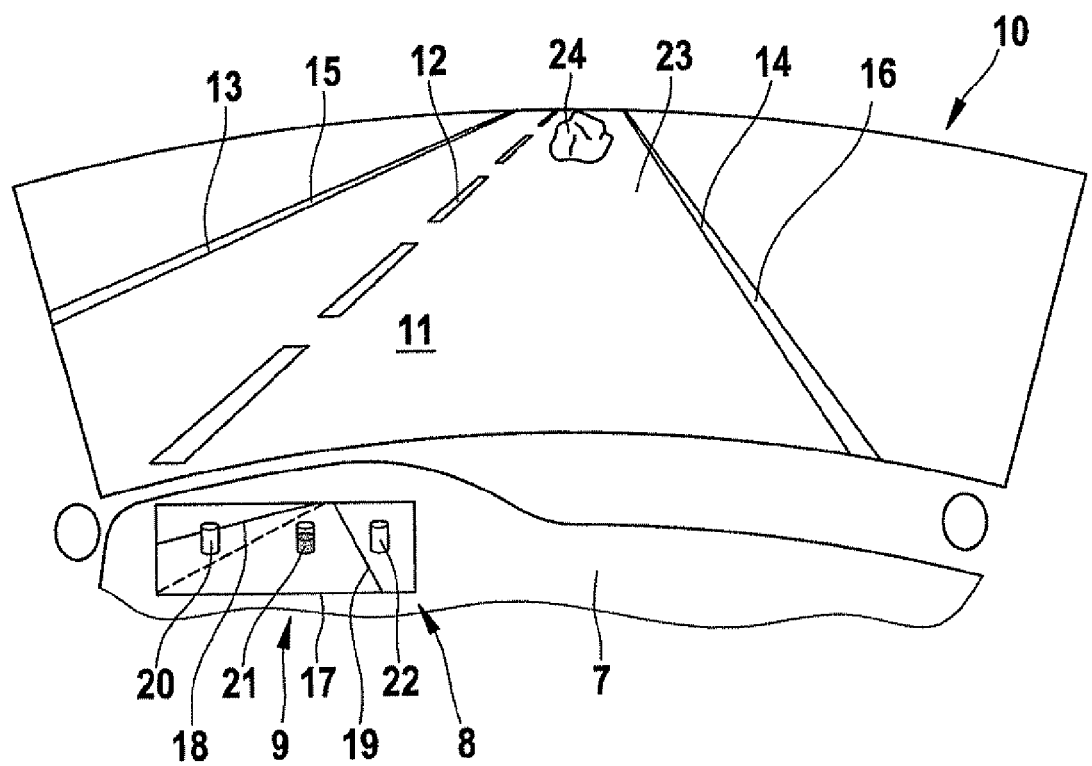
FIG. 2 shows an instrument panel of a motor vehicle having a display device.

Based on FIGS. 2 through 5, a method and a device are described for assisting in driving a vehicle, which—like the method according to FIG. 1, as well—include a continuous, analog driver warning. FIG. 2 depicts an instrument panel 7 of a motor vehicle having an output device 9, output device 9 taking the form of a display device 8 having a display screen 17, and a human-machine interface of a device which, in this exemplary embodiment, is a component of a driver assistance system (DAS) for collision warning, to carry out a method for assisting in driving the motor vehicle. Also shown is a view through a windshield 10 of the motor vehicle onto a roadway 11 in front of the motor vehicle on which it is to travel, having a median strip 12 and side strips 13, 14 which separate roadway 11 from shoulders 15, 16.

In this exemplary embodiment, display device 8 is implemented as a "head-down display" (HDD), that is, display device 8 is disposed in a lower visual range of a driver of the motor vehicle; however, it is also possible to implement the display device as a head-up display (HUD), for instance, in which outputs to the driver are reflected into the windshield, for example.

The roadway to be seen through windshield 10 is imaged perspectively with corresponding side strips 18, 19 on display screen 17 of display device 8. In addition, three cylinders 20 through 22 are represented at laterally constant, fixed positions on display screen 17. These cylinders 20 through 22 are each filled up to a certain level, the fill level depending on the instantaneous reliability of the assertion, which may also be called the detection reliability, of the device with respect to a risk level. A color of the filling of cylinders 20 through 22 corresponds to a risk level to the motor vehicle ascertained by the device for a current roadway area represented on display device 8.

In a driving situation shown by way of example in FIG. 2, only one object 24 is detected by the device in its own traffic lane 23, which corresponds to a right traffic lane 23 of roadway 11. This object 24, depicted illustratively as a piece of rock, is in traffic lane 23 of the host vehicle. A "time-to-collision" (TTC) analysis carried out by an evaluation unit of the device thereby reveals a high risk for the motor vehicle.

Therefore, middle cylinder 21 of the three cylinders 20 through 22 on display screen 17 is filled, by way of example, with red color. However, since at the present instant, the device is only certain about the actual existence of object 24 on roadway 11 to a certain degree, e.g., a certain percentage, which may be the case, for example, because of measuring failures of a detector, belonging to the device, for detecting the surroundings of the motor vehicle, middle cylinder 21 is not completely filled with the red color. This reliability of the assertion of the device is therefore reflected in the degree of filling of middle cylinder 21. A risk level for the motor vehicle, which may also be known as situation riskiness, may be represented, for example, by a steady transition of the color of the filling of middle cylinder 21 from green via yellow to red.

Figure 3:
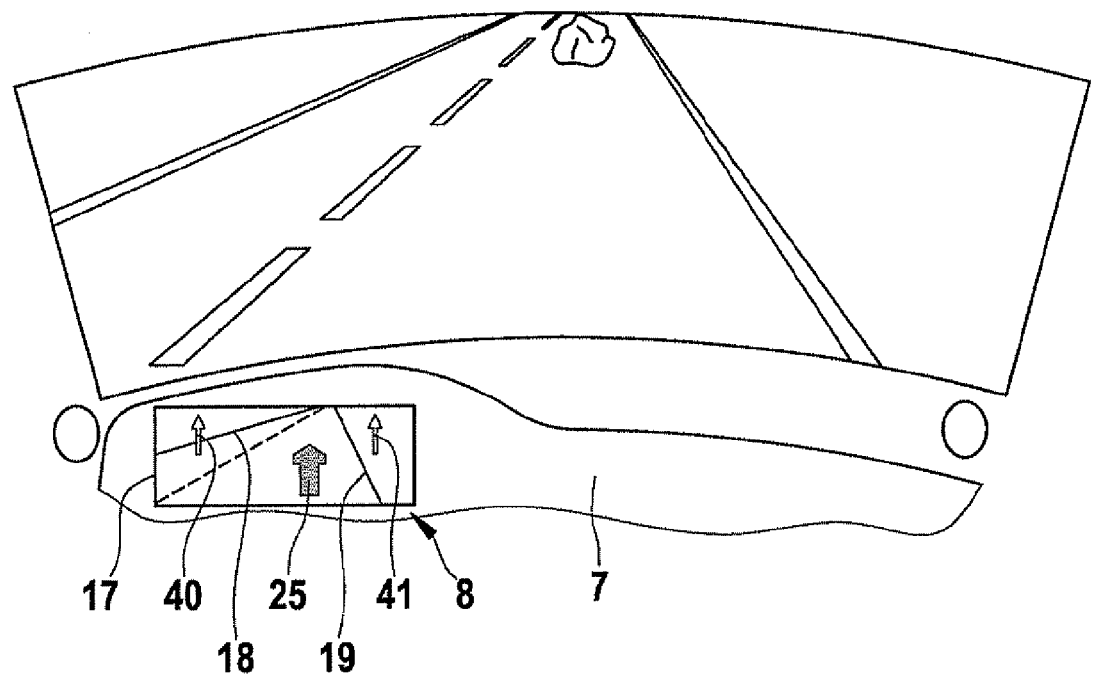
FIG. 3 shows another instrument panel of a motor vehicle having a display device.

A further exemplary embodiment having another instrument panel 7 including a display device 8 of a motor vehicle is shown in FIG. 3. A roadway situated in front of the motor vehicle and having side strips 18, 19 is depicted on a display screen 17 of display device 8. Instead of the cylinders according to FIG. 2, a middle arrow 25 and two arrows 40, 41 on the sides are provided here for the display of information concerning the vehicle surroundings. Unlike the color display used according to FIG. 2, in this exemplary embodiment, a blinking of middle arrow 25, and specifically in detail, a build-up speed, which may also be denoted as movement speed, of arrow 25 that leads to the blinking is used to convey an instantaneous risk level to the driver. For example, the reliability of the assertion or detection reliability may be indicated by a variable light intensity of the representation of middle arrow 25.

Figure 4:
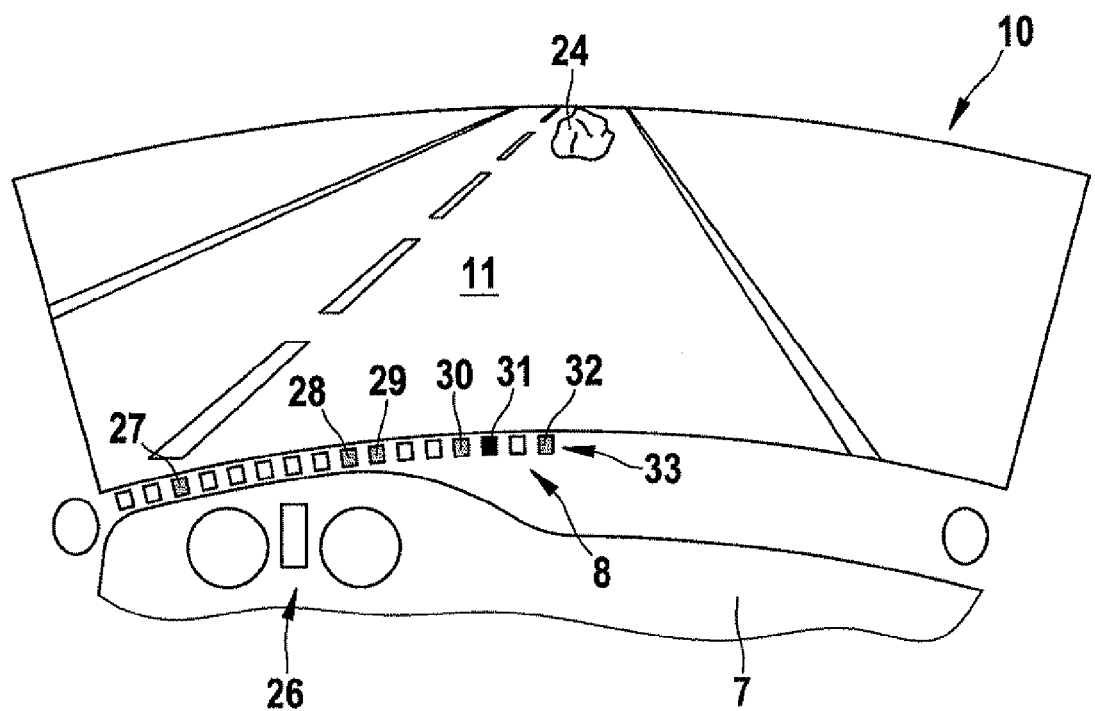
FIG. 4 shows a further instrument panel of a motor vehicle having a display device.

FIG. 4 shows an additional exemplary embodiment having a further instrument panel 7, which here additionally features an indicating-instrument cluster 26, including a display device 8 of a motor vehicle. Instead of a display screen, a lighting chain 33 taking the form of an LED chain is provided here for the output of information concerning the vehicle surroundings and a risk level to a driver of the motor vehicle. For example, in this case, positions of LEDs 27 through 32 emitting light in lighting chain 33 may indicate objects in the surroundings of the motor vehicle potentially signifying a danger of collision for the motor vehicle. LEDs 27 through 32 may be controlled in such a way that they light up with a light intensity corresponding to the risk level of the respective object. In this exemplary embodiment, third LED 31 from the right in lighting chain 33 is shining with the greatest light intensity, since a rock-shaped object 24 standing on roadway 11 discernible through a windshield 10 of the motor vehicle signifies the greatest danger for the motor vehicle within the motor-vehicle surroundings.

Figure 5:
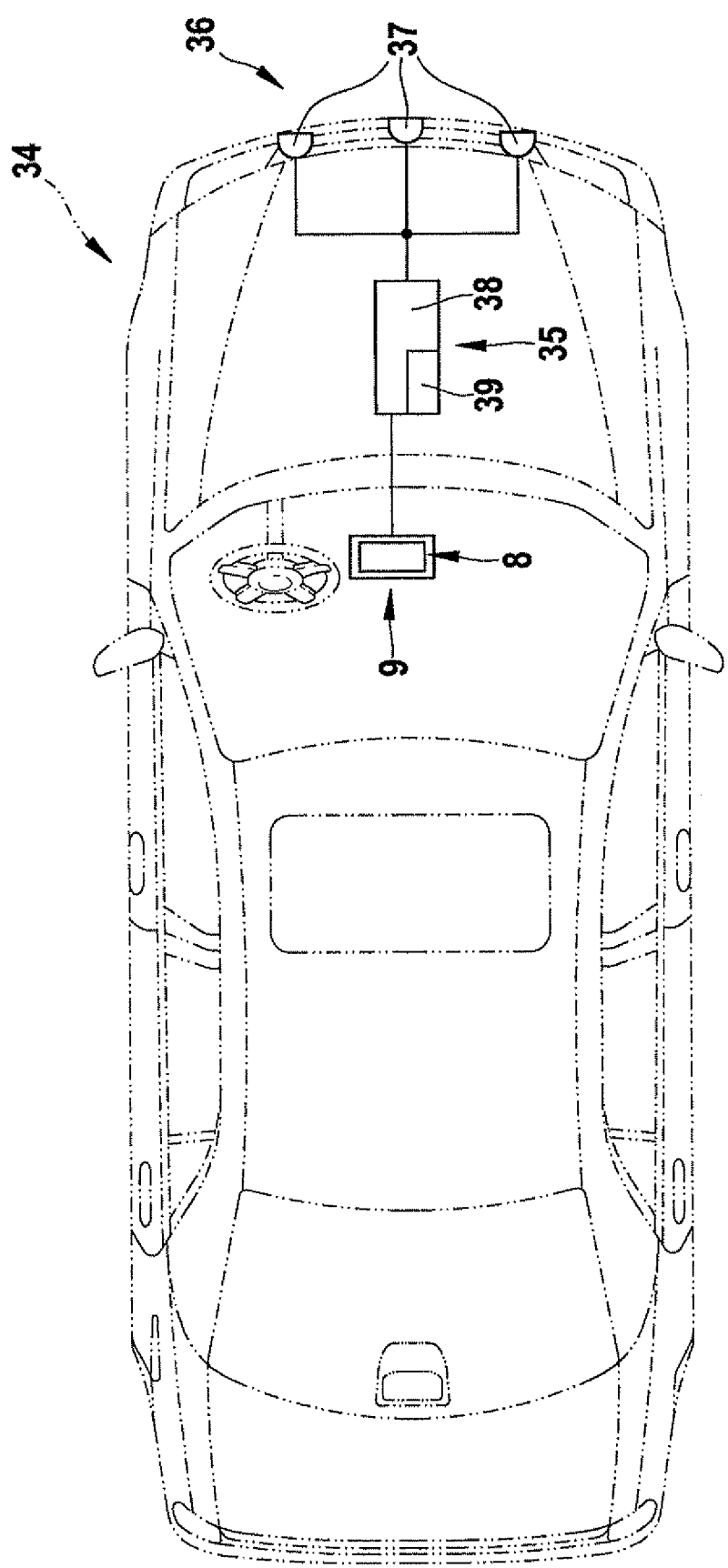
FIG. 5 shows a vehicle having a device for assisting in driving the vehicle.
Figure 6:
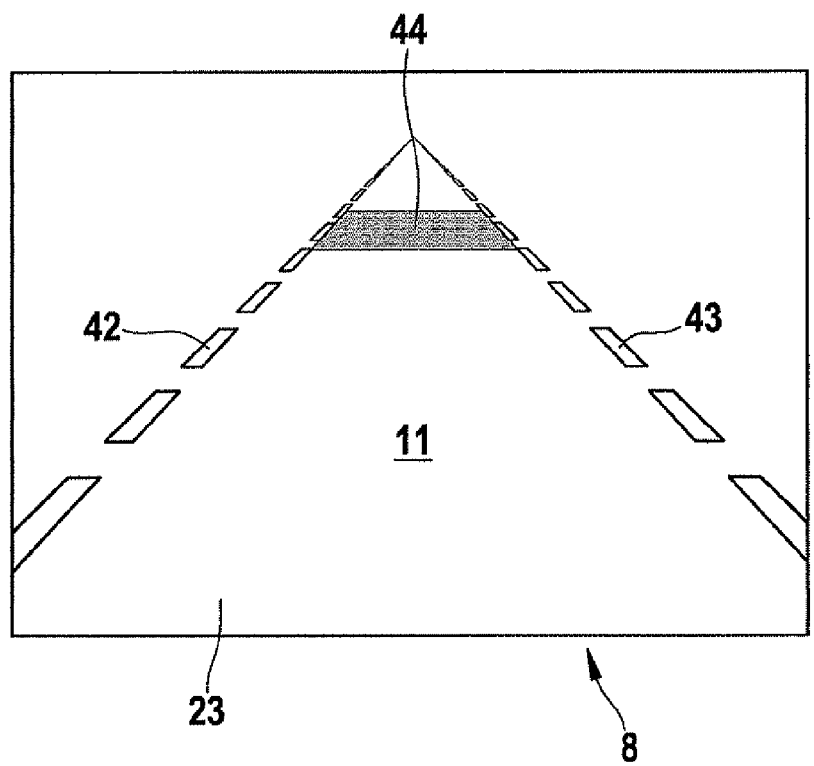
FIGS. 6 to 9 show a further example display device of a motor vehicle.
Figure 7:
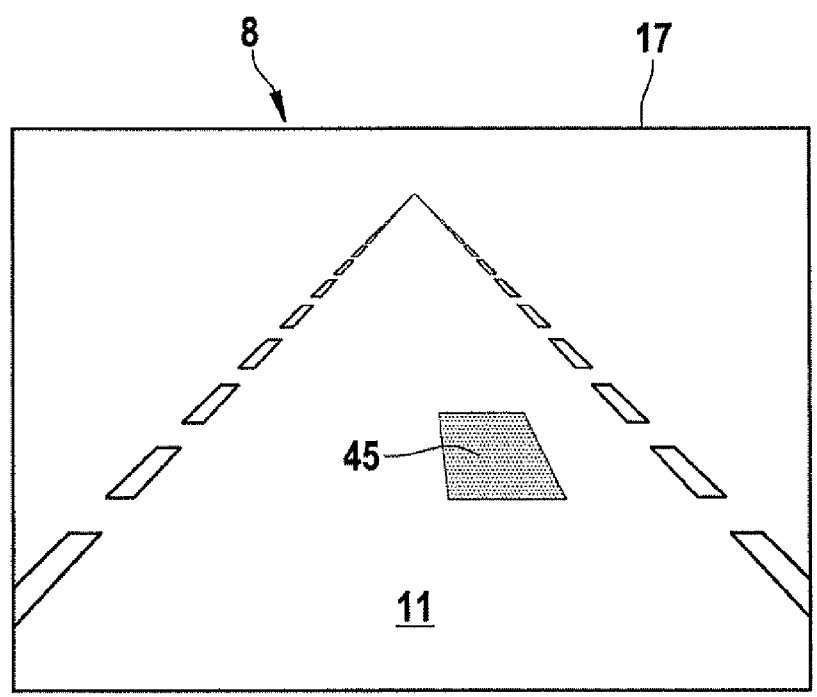

Moreover, FIG. 5 shows a vehicle 34 taking the form of a motor vehicle, and specifically here, an automobile, having a device 35 forming a component of a collision-warning DAS, particularly of a warning night-vision DAS, for carrying out a method described above for assisting in driving vehicle 34. At the front end of the vehicle, device 35 has a surroundings detector 36 having three sensors 37 for detecting a partial area, situated in front of vehicle 34, of a surroundings of vehicle 34, and in addition, has an output device 9 having a display device 8 for the output of information concerning the vehicle surroundings obtained from the surroundings detection, to a driver of vehicle 34. Furthermore, an evaluation unit 38 is provided for determining a risk level based on the vehicle-surroundings information. Output device 9 is controllable by evaluation unit 38, which includes a control unit 39, in such a way that the vehicle-surroundings information and the risk level are able to be output continuously by output device 9 to the driver.

In another exemplary embodiment according to FIGS. 6 through 9, a device for assisting in driving a vehicle taking the form of a motor vehicle—which may be a motor vehicle according to FIG. 5, for example—with the aid of a continuous analog driver warning, has an output device designed as display device 8 which here is implemented as a HUD, but which in principle may also be a HDD. A roadway 11 lying in front of the motor vehicle and to be traveled by it is shown in a perspective representation on display device 8.

A roadway area belonging to a traffic lane 23 of the motor vehicle is marked by lateral, broken boundary lines 42, 43, respectively.

On display device 8, roadway 11 has at least one display segment 44 which is situated between boundary lines 42, 43, For instance, this display segment 44 stands out due to a shading which corresponds to a specific gray-scale value, for example. The shading, particularly the gray-scale value, of display segment 44 changes according to a risk level which is determined for an object, located within a roadway area corresponding to display segment 44, with regard to the motor vehicle. Preferably the shading lightens as the risk level increases.

For example, display segment 44 is represented in light gray when the motor vehicle is approaching an object standing in its own traffic lane 23, whereas display segment 44 is represented in dark gray, for example, when the aforesaid object—e.g., as a vehicle preceding the motor vehicle—is moving in front of the motor vehicle in the same direction with it.

In the case of a perspective representation selected here, preferably display segment 44 may change in size and/or position in response to the changing distance of the motor vehicle to the object. Moreover, it is possible to increase the lateral resolution of a segmented display screen 17 of display device 8 for small distances between object and motor vehicle by the addition of further, laterally arranged display segments, as shown by way of example on the basis of a display segment 45 in FIG. 7. For example, display segment 45 may also be shown in color, the color of display segment 45 changing with the risk level; for instance, the color may change from green via yellow to red as the risk level rises.

Figure 8:
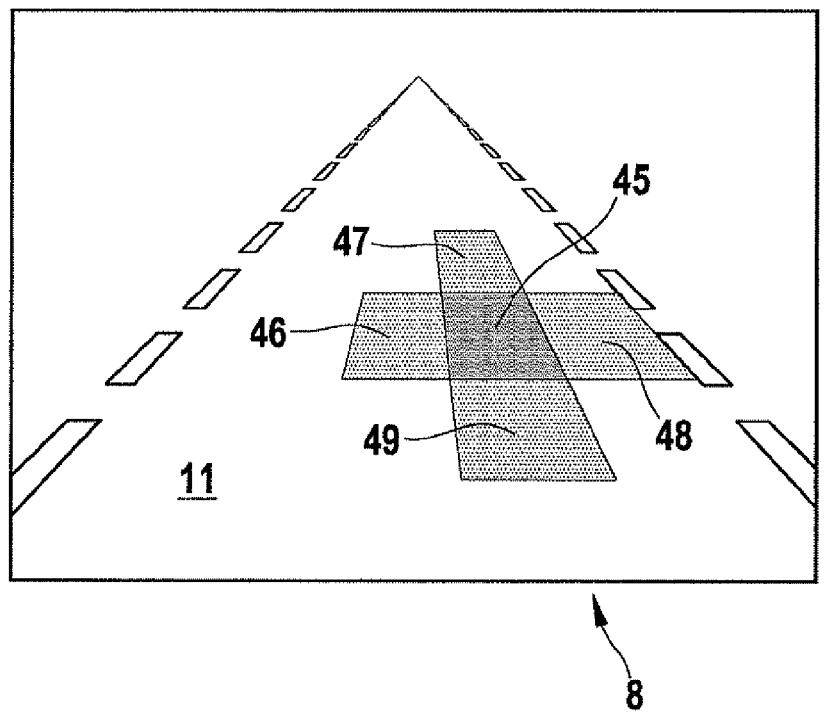

By providing a plurality of corresponding display segments 45 through 49—as shown in FIG. 8—a resolution, particularly a lateral resolution of the output device may be increased, thereby possibly making it easier for a driver of the motor vehicle to locate in the real vehicle surroundings, an object which is jeopardizing his own motor vehicle. Transitions between display segments 45 through 49 are preferably represented progressively both laterally and longitudinally, in order to avoid sudden changes in the display and possibly to express an uncertainty in fixing the position of the jeopardizing object. For example, it is possible to represent lateral display segments 46, 48 in color in such a way that they include a mixture of a color value of a middle display segment 45 and a background color shown on display device 8.

Figure 9:
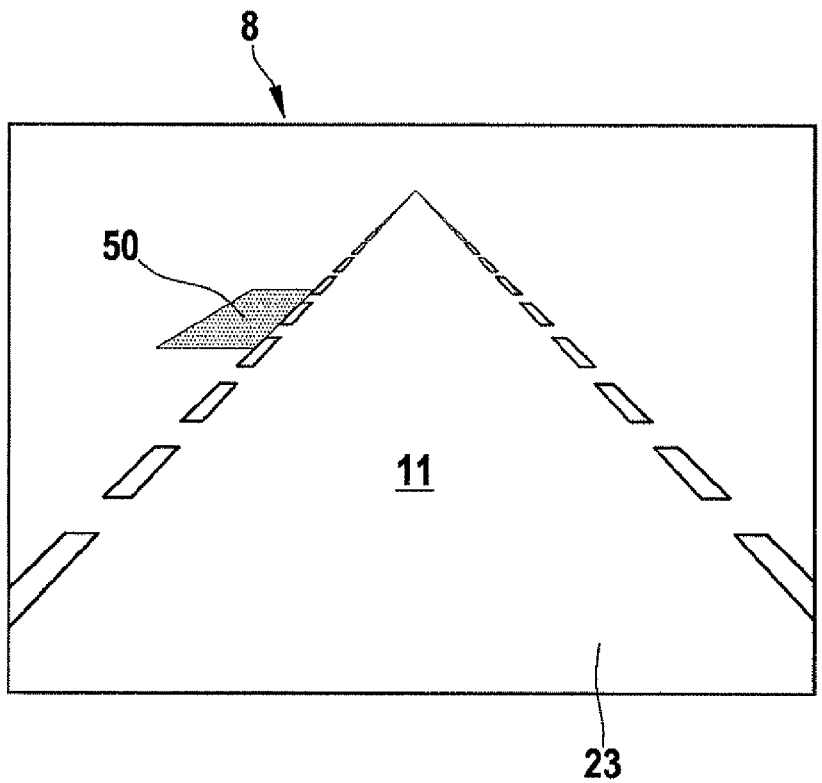

Preferably, oncoming traffic and other peripheral objects not in traffic lane 23 of the host vehicle may additionally be represented on display device 8; this is shown in FIG. 9 with the aid of a lateral display segment 50 here symbolizing oncoming traffic. In this way, the driver is additionally allowed to track on display device 8, objects possibly mistakenly assigned to traffic lane 23 of the host vehicle by a detector for detecting the surroundings of the motor vehicle, even when they are no longer detected in traffic lane 23 of the host vehicle. The driver's understanding of potential misinformation because of an incorrect lane assignment may thus be increased. Advantageously, such additional representations like oncoming traffic and peripheral objects may be represented by a static, i.e., non-changeable shading, particularly a gray-scale value, since they represent no immediate danger for the motor vehicle.

A reliability of the assertion with respect to the risk level for the motor vehicle, which optionally includes the plausibility of an actual existence of the jeopardizing object, may be expressed, e.g., by a changeable transparency of display segments 44 through 50 (see FIGS. 6 through 9), the transparency of a specific display segment preferably decreasing as the reliability of the assertion increases, that is, the more transparently a display segment is represented, the lower is the reliability of the assertion. In general, the representation of respective display segments 44 through 50, especially their shading or gray-scale value and/or color and/or transparency and/or size and/or position does not change suddenly, but rather with soft flowing transitions along the lines of a stepless representation.

To monitor the driving conditions of the vehicle, the speed with which the vehicle is presently traveling is monitored, e.g., via a vehicle speed sensor. At a speed of up to 130 km/h, a driving risk is estimated to be low, and beginning from there up to the maximum speed of the vehicle, increases to a medium risk, for example. To monitor the vehicle condition, e.g., the tire pressure in the individual tires may be checked via a tire-pressure sensor, or the functioning of light sources of the lighting equipment, e.g., functioning of a brake light or a light source for the low headlight beam, may be checked in each instance by an associated electronic test circuit. If the pressure in a tire is too low or a light source is defective, a corresponding driving risk may then be ascertained. Thus, for example, if one brake light is defective, a medium risk may be ascertained, and in the event two brake lights are defective, a high driving risk may be ascertained. For the tire pressure, suitable limiting values may be established as a function of the vehicle which, when they are not attained, a medium or a high risk is determined, for example.

Furthermore, the monitoring of the driving conditions or the vehicle condition may be combined with a monitoring of the vehicle surroundings. Thus, for example, given a speed of 120 km/h on a turnpike at an outside temperature of more than 5° C. and no precipitation, the driving risk is set low (green range). However, if during such a drive it is determined that the pressure at one of the tires is too low by more than 0.5 bar, the driving risk then increases to a middle range. If, for instance, it is additionally determined that the lighting is defective, then a high risk would be indicated. In the same way, starting from the situation in the green range, for the case that additionally an obstacle is ascertained in front of the vehicle, a high risk may be determined. For example, by an additional acoustical output, the driver may then be given the instruction: "Please reduce speed."

The output of the risk is displayed together with the monitoring of the surround-field system in the risk display. In so doing, in a first specific embodiment, the highest risk potential may always be displayed; however, in a further specific embodiment, the risks resulting from the surroundings and the vehicle condition or the driving conditions of the vehicle may also be taken into account cumulatively. The recording is preferably statistically evaluable in such a way that, in particular, the frequency and the duration of high risk situations are able to be displayed to a driver. Against this background, if desired, the driver may correct his driving behavior in order to avoid risk situations to the greatest extent possible in the future.

What is claimed is:

1. A method for assisting in driving a vehicle, comprising:
 detecting, with a surroundings detector, at least a partial area of surroundings of the vehicle;
 determining, using an evaluation unit, a risk level based on the detected vehicle surroundings;
 determining, using the evaluation unit, a reliability of the determined risk level; and
 continuously outputting to a vehicle driver, during operation of the vehicle, and using an output device, information concerning the detected vehicle surroundings, and the risk level and risk level reliability determined by the evaluation unit;
 wherein:
 vehicle sensors are evaluated with respect to at least one of driving conditions and operating conditions of the vehicle; and
 a risk emanating from the at least one of the driving conditions and operating conditions of the vehicle is analyzed and taken into consideration for the determination of the risk level.

2. The method as recited in claim 1, wherein at least a portion of (a) the information concerning the detected vehicle surroundings, (b) the risk level, and (c) the reliability of the determined risk level is displayed by the output device.

3. The method as recited in claim 2, wherein at least one of the risk level is output using a color-variable color display, and a color of the color-variable color display is a measure for the risk level.

4. The method as recited in claim 2, wherein the reliability of the determined risk level is output using a bar display that is variable lengthwise, and a length of the bar display is a measure for the reliability of the determined risk level.

5. The method as recited in claim 4, wherein the risk level is output using a blinking display, and at least one of a blinking frequency and a build-up speed of the blinking display is a measure for the risk level.

6. The method as recited in claim 5, wherein the reliability of the determined risk level is output using one of the color display, bar display and blinking display that is variable in light intensity, and a light intensity of the one of the color display, bar display, and blinking display is a measure for the reliability of the assertion.

7. The method as recited in claim 2, wherein at least a portion of the information concerning the detected vehicle surroundings is displayed by the output device on a display device at a position on the display device corresponding to a location of a possible risk in the surroundings of the vehicle.

8. A device for a vehicle, comprising:
 a surroundings detector adapted to detect at least a partial area of surroundings of the vehicle;
 an evaluation unit adapted to:
 determine a risk level based on the detected vehicle surroundings; and
 determine a reliability of the determined risk level; and
 an output device adapted to continuously output to a vehicle driver during operation of the vehicle, information concerning the detected vehicle surroundings, and the risk level and risk level reliability determined by the evaluation unit
 wherein:
 the evaluation unit is adapted for evaluating at least one of driving conditions and operating conditions of the vehicle; and
 a risk emanating from the at least one of the driving conditions and operating conditions of the vehicle is analyzed and taken into consideration for the determination of the risk level.

9. The device as recited in claim 8, wherein the output device includes a display screen.

10. The device as recited in claim 8, wherein the output device includes a lighting chain.

* * * * *